United States Patent
Ghosh et al.

(10) Patent No.: US 7,277,590 B2
(45) Date of Patent: Oct. 2, 2007

(54) IMAGE PROCESSING METHOD AND APPARATUS

(75) Inventors: Pinaki Ghosh, Bangalore (IN); Preethish Kumar Manohar, Bangalore (IN); Ananthakrishna Madhyastha, Bangalore (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 679 days.

(21) Appl. No.: 10/862,082

(22) Filed: Jun. 4, 2004

(65) Prior Publication Data

US 2004/0247198 A1 Dec. 9, 2004

(30) Foreign Application Priority Data

Jun. 6, 2003 (JP) .............................. 2003-161938

(51) Int. Cl.
*G06K 9/40* (2006.01)
*G06K 9/00* (2006.01)

(52) U.S. Cl. ........................................ 382/260; 382/128
(58) Field of Classification Search ........ 382/260–264, 382/254, 128; 600/410
See application file for complete search history.

(56) References Cited

U.S. PATENT DOCUMENTS

| 5,390,264 | A | 2/1995 | Ishihara et al. |
| 5,408,338 | A | 4/1995 | Koike |
| 5,561,724 | A | 10/1996 | Kido et al. |
| 6,731,821 | B1 * | 5/2004 | Maurer et al. ............... 382/263 |
| 7,187,794 | B2 * | 3/2007 | Liang et al. ................. 382/131 |
| 2002/0172431 | A1 * | 11/2002 | Atkins et al. ............... 382/260 |
| 2005/0027188 | A1 * | 2/2005 | Metaxas et al. ............ 600/410 |

\* cited by examiner

*Primary Examiner*—Yon J. Couso
(74) *Attorney, Agent, or Firm*—Armstrong Teasdale LLP

(57) ABSTRACT

An image processing method for conducting anisotropic diffusion filtering on a pixel value $I_{i,j}$ in a two-dimensional image, comprises: finding conduction coefficients $C_n$, $C_s$, $C_w$, $C_e$, $C_{nw}$, $C_{sw}$, $C_{ne}$ and $C_{se}$ in eight surrounding directions for each pixel based on a pixel value gradient $\nabla I$ to produce a two-dimensional distribution image of the conduction coefficients; and finding pixel value first partial differentials $\nabla_n I$, $\nabla_s I$, $\nabla_w I$, $\nabla_e I$, $\nabla_{nw} I$, $\nabla_{sw} I$, $\nabla_{ne} I$ and $\nabla_{se} I$ in the eight surrounding directions for each pixel to calculate a pixel value in an output image according to:

$$I_{i,j}^{n+1} = I_{i,j}^m + \lambda \left[ [C_n \cdot \nabla_n I + C_s \cdot \nabla_s I + C_w \cdot \nabla_w I + C_e \cdot \nabla_e I] + \frac{1}{\sqrt{2}} [C_{nw} \cdot \nabla_{nw} I + C_{sw} \cdot \nabla_{sw} I + C_{ne} \cdot \nabla_{ne} I + C_{nw} \cdot \nabla_{nw} I] \right]_{i,j}^n,$$

(n: the number of times of repetition, λ: a constant).

8 Claims, 3 Drawing Sheets

IMAGE PROCESSING METHOD AND APPARATUS

CROSS REFERENCE TO RELATED APPLICATIONS

This application claims the benefit of Japanese Application No. 2003-161938 filed Jun. 6, 2003.

BACKGROUND OF THE INVENTION

The present invention relates to an image processing method and apparatus, and more particularly to a method and apparatus for conducting anisotropic diffusion filtering on a two-dimensional image.

Filtering techniques that can remove noise from a two-dimensional image without a side effect such as edge degradation, include anisotropic diffusion filtering.

The anisotropic diffusion filtering comprises: finding pixel differential values with respect to nearest surrounding pixels for each pixel, finding conduction coefficients for each pixel based on a pixel value gradient, and using the conduction coefficients and pixel differential values to calculate a pixel value in an output image according to a predefined calculation formula.

The calculation formula is of a scale-space type, in which the calculation result in one pass is used as an input to the next pass and the calculation is repeated a plurality of times. As the calculation is repeated more times, noise is incrementally reduced (for example, see Non-Patent Document 1).

[Non-Patent Document 1]

Pietro Perona, et al., Scale-Space and Edge Detection Using Anisotropic Diffusion, *IEEE Transactions on Pattern Analysis and Machine Intelligence* (U.S.), Vol. 12, No. 7, pp. 629-639, 1990.

Such anisotropic diffusion filtering involves finding the pixel value gradient for each pixel and saving it once as a two-dimensional distribution image, reading the pixel value gradient from the two-dimensional distribution image to calculate the conduction coefficients, and then calculating the pixel value in the output image using the coefficients and pixel differential values, and conducts such processing on a pixel-by-pixel basis, resulting in a long time and slow operation.

SUMMARY OF THE INVENTION

It is therefore an object of the present invention to provide a method and apparatus for conducting the anisotropic diffusion filtering in a shorter time.

(1) The present invention, in one aspect for solving the aforementioned problem, is an image processing method for conducting anisotropic diffusion filtering on a pixel value $I_{i,j}$ in a two-dimensional image, characterized in comprising: finding conduction coefficients $C_n$, $C_s$, $C_w$, $C_e$, $C_{nw}$, $C_{sw}$, $C_{ne}$ and $C_{se}$ in eight surrounding directions for each pixel based on a pixel value gradient $\nabla I$ to produce a two-dimensional distribution image of the conduction coefficients; and finding pixel value first partial differentials $\nabla_n I$, $\nabla_s I$, $\nabla_w I$, $\nabla_e I$, $\nabla_{nw} I$, $\nabla_{sw} I$, $\nabla_{ne} I$ and $\nabla_{se} I$ in the eight surrounding directions for each pixel to calculate a pixel value in an output image according to:

$$I_{i,j}^{n+1} = I_{i,j}^m + \lambda \left[ [C_n \cdot \nabla_n I + C_s \cdot \nabla_s I + C_w \cdot \nabla_w I + C_e \cdot \nabla_e I] + \frac{1}{\sqrt{2}} [C_{nw} \cdot \nabla_{nw} I + C_{sw} \cdot \nabla_{sw} I + C_{ne} \cdot \nabla_{ne} I + C_{nw} \cdot \nabla_{nw} I] \right]_{i,j}^n,$$

(n: the number of times of repetition, $\lambda$: a constant).

(2) The present invention, in another aspect for solving the aforementioned problem, is an image processing apparatus for conducting anisotropic diffusion filtering on a pixel value $I_{i,j}$ in a two-dimensional image, characterized in comprising: coefficient image producing means for finding conduction coefficients $C_n$, $C_s$, $C_w$, $C_e$, $C_{nw}$, $C_{sw}$, $C_{ne}$ and $C_{se}$ in eight surrounding directions for each pixel based on a pixel value gradient $\nabla I$ to produce a two-dimensional distribution image of the conduction coefficients; and calculating means for finding pixel value first partial differentials $\nabla_n I$, $\nabla_s I$, $\nabla_w I$, $\nabla_e I$, $\nabla_{nw} I$, $\nabla_{sw} I$ $\nabla_{ne} I$ and $\nabla_{se} I$ in the eight surrounding directions for each pixel to calculate a pixel value in an output image according to:

$$I_{i,j}^{n+1} = I_{i,j}^m + \lambda \left[ [C_n \cdot \nabla_n I + C_s \cdot \nabla_s I + C_w \cdot \nabla_w I + C_e \cdot \nabla_e I] + \frac{1}{\sqrt{2}} [C_{nw} \cdot \nabla_{nw} I + C_{sw} \cdot \nabla_{sw} I + C_{ne} \cdot \nabla_{ne} I + C_{nw} \cdot \nabla_{nw} I] \right]_{i,j}^n,$$

(n: the number of times of repetition, $\lambda$: a constant).

In the invention of the aforementioned aspects, since the conduction coefficients in the eight surrounding directions are found for each pixel based on the pixel value gradient VI and their two-dimensional distribution image is produced, the conduction coefficients can be read from the two-dimensional distribution image and immediately used. Thus, unlike in the conventional technique, a two-stage procedure of reading the pixel value gradient from the two-dimensional distribution image of pixel value gradients and calculating the conduction coefficients using the pixel value gradient is not needed, resulting in a reduced time.

Preferably, said conduction coefficients are found according to:

$$g = e^{-(\|\nabla I\|/k)^2},$$

(k: a constant), so that appropriate conduction coefficients can be obtained. Preferably, said constant $\lambda$ is $0 \leq \lambda \leq 1/4$, so that the filtering is suitably achieved. Preferably, said two-dimensional image is a medical image, so that a clinically useful image can be obtained.

Therefore, the present invention provides a method and apparatus for conducting anisotropic diffusion filtering in a shorter time.

Further objects and advantages of the present invention will be apparent from the following description of the preferred embodiments of the invention as illustrated in the accompanying drawings.

DETAILED DESCRIPTION OF THE INVENTION

Figure 1:
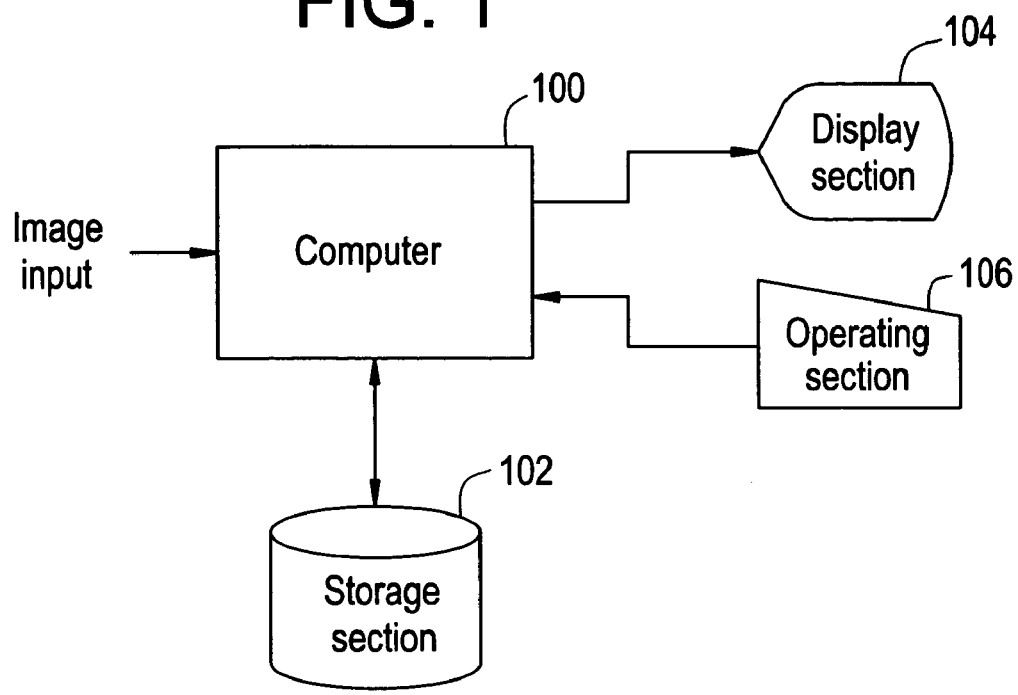
FIG. 1 is a block diagram of an apparatus in an embodiment of the present invention.

Embodiments of the present invention will now be described in detail with reference to the accompanying drawings. FIG. 1 shows a block diagram of an image processing apparatus. The apparatus is one embodiment of the present invention. The configuration of the apparatus represents an embodiment of the apparatus of the present invention. The operation of the apparatus represents an embodiment of the method of the present invention.

As shown in FIG. 1, the apparatus comprises a computer 100. The computer 100 is input with an image to be processed. The computer 100 comprises a storage section 102. The storage section 102 stores the input image. The storage section 102 also stores several kinds of data and programs for the computer 100. Several kinds of data processing relating to image processing are achieved by the computer 100 executing a program stored in the storage section 102.

The computer 100 also comprises a display section 104 and an operating section 106. The display section 104 displays an image output by the computer 100 and other information. The operating section 106 is operated by a user, and supplies several kinds of instructions and information to the computer 100. The user can use the display section 104 and operating section 106 to interactively operate the present apparatus.

Figure 2:
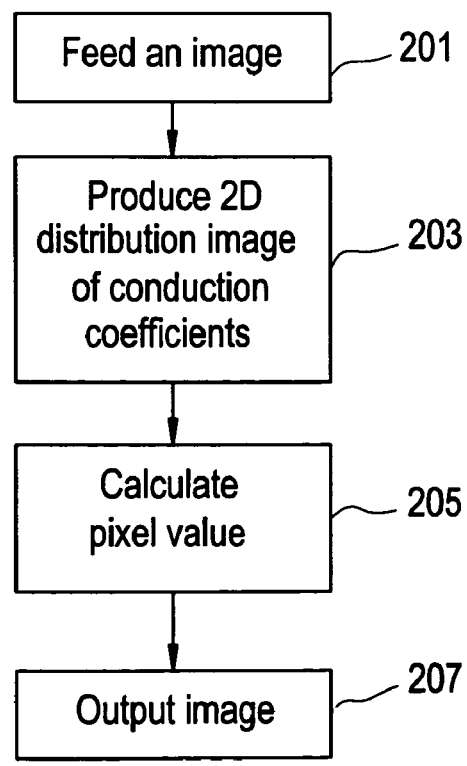
FIG. 2 is a flow chart of the operation of the apparatus in an embodiment of the present invention.

The operation of the apparatus will be now described. FIG. 2 shows a flow chart of the operation of the apparatus. The operation of the apparatus is achieved by the computer 100 executing a program stored in the storage section 102.

Figure 3:
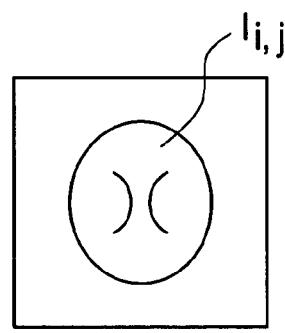
FIG. 3 is a conceptual diagram of an image.

As shown, at Stage 201, an image is fed. For example, an image as shown in FIG. 3 is stored in the storage section 102. The image is, for example, a head tomographic image captured by a magnetic resonance imaging apparatus. Such an image is a grayscale image representing the anatomy of a brain, and has a pixel value of $I_{i,j}$. The subscripts i and j represent two-dimensional coordinates.

Figure 4:
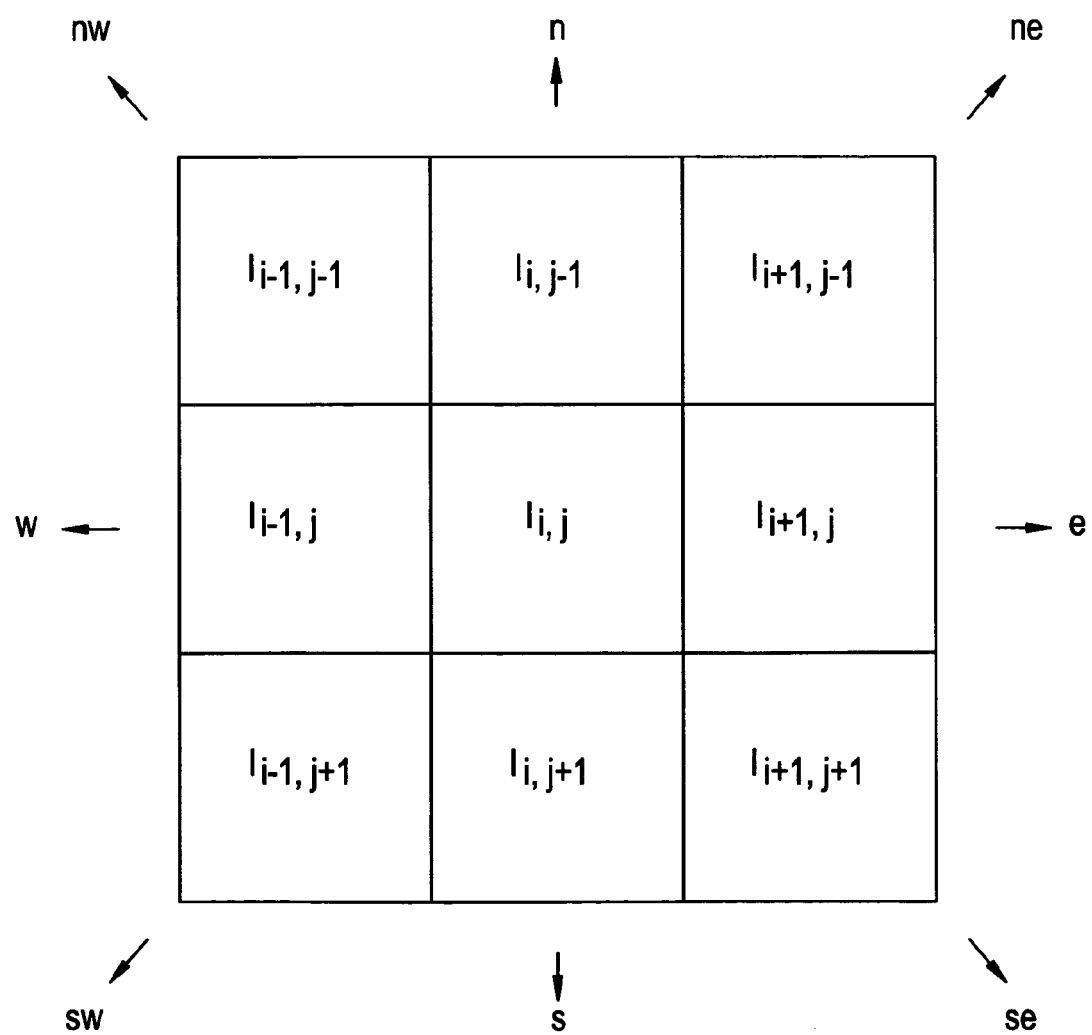
FIG. 4 shows an arrangement of pixel values.

The pixel value $I_{i,j}$ and eight nearest pixel values in eight surrounding directions are shown in FIG. 4. As illustrated, the directions of the eight nearest pixel values from the pixel value $I_{i,j}$ are designated as n, s, w, e, nw, sw, ne and se.

Next, at Stage 203, a two-dimensional distribution image of conduction coefficients is produced. The conduction coefficients are found using the gradient $\nabla I$ of the pixel value $I_{i,j}$, according to the following equation:

$$g = e^{-((\|\nabla I\|/k)^2)},$$

wherein $\nabla$: an operator "nabla", and k: a constant.

Conduction coefficients to be found are conduction coefficients $C_n$, $C_s$, $C_w$, $C_e$, $C_{nw}$, $C_{sw}$, $C_{ne}$ and $C_{se}$ in the eight surrounding directions n, s, w, e, nw, sw, ne and se for the pixel value $I_{i,j}$. Such coefficients are found for each pixel value in the input image, and the two-dimensional distribution image of the conduction coefficients is produced based thereupon.

Next, at Stage 205, a pixel value is calculated. The pixel value calculation is achieved by finding first partial differentials $\nabla_n I$, $\nabla_s I$, $\nabla_w I$, $\nabla_e I$, $\nabla_{nw} I$, $\nabla_{sw} I$, $\nabla_{ne} I$ and $\nabla_{se} I$ of the pixel value $I_{i,j}$ in the eight surrounding directions, and calculating a pixel value in an output image according to the following equation:

$$I_{i,j}^{n+1} = I_{i,j}^m + \lambda \left[ [C_n \cdot \nabla_n I + C_s \cdot \nabla_s I + C_w \cdot \nabla_w I + C_e \cdot \nabla_e I] + \frac{1}{\sqrt{2}} [C_{nw} \cdot \nabla_{nw} I + C_{sw} \cdot \nabla_{sw} I + C_{ne} \cdot \nabla_{ne} I + C_{nw} \cdot \nabla_{nw} I] \right]_{i,j}^n,$$

wherein

□: a partial differential operator (not "nabla"), n: the number of times of repetition, and $\lambda$: a constant ($0 \leq \lambda \leq \frac{1}{4}$).

The calculation is conducted for each pixel value in the input image. At that time, for the conduction coefficients $C_n$, $C_s$, $C_w$, $C_e$, $C_{nw}$, $C_{sw}$, $C_{ne}$ and $C_{se}$, those corresponding to each pixel value in the input image are read from the two-dimensional distribution image of the conduction coefficients and are used.

Since the conduction coefficients are thus read from the two-dimensional distribution image for use in the calculation, the calculation time is reduced as compared with the conventional technique comprising a two-stage procedure of reading a pixel value gradient from the two-dimensional distribution image of pixel value gradients and calculating the conduction coefficients using the pixel value gradient. By experimental measurement, the computation time is reduced to $\frac{1}{3}$-$\frac{1}{4}$ of the conventional technique. In other words, the calculation speed is improved by a factor of three or four as compared with the conventional technique.

The filtered image is output at Stage 207. Since noise is reduced and edge is intact in the output image, characteristic structures in the image are further clarified. Accordingly, clinical utility of the image is further improved when the input image is a medical image.

Figure 5:
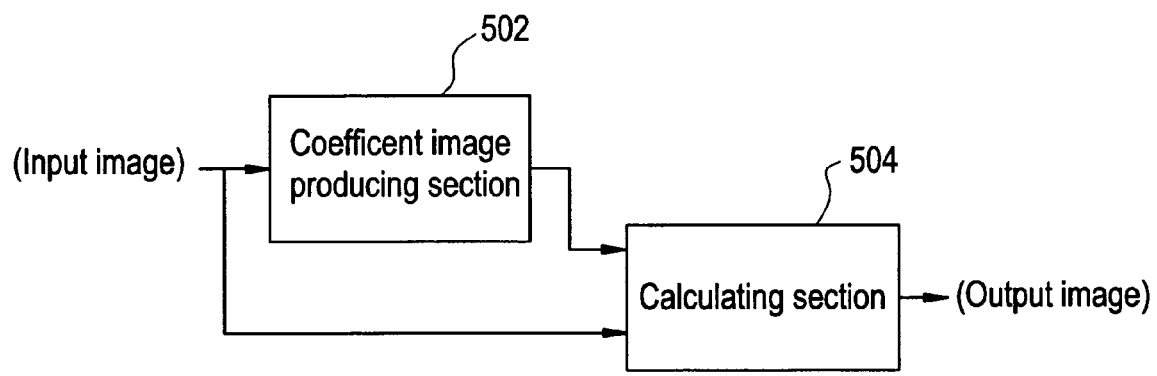
FIG. 5 is a functional block diagram of the apparatus in an embodiment of the present invention.

FIG. 5 shows a functional block diagram of the present apparatus conducting the operation as described above. As shown, the apparatus comprises a coefficient image producing section 502 and a calculating section 504. The coefficient image producing section 502 corresponds to a function of the computer 100 for conducting the operation at Stage 203. The coefficient image producing section 502 is an embodiment of the coefficient image producing means in accordance with the present invention. The calculating section 504 corresponds to a function of the computer 100 for conducting the operation at Stage 205. The calculating section 504 is an embodiment of the calculating means in accordance with the present invention.

Many widely different embodiments of the invention may be configured without departing from the spirit and the scope of the present invention. It should be understood that the present invention is not limited to the specific embodiments described in the specification, except as defined in the appended claims.

The invention claimed is:

1. An image processing method for conducting anisotropic diffusion filtering on a pixel value $I_{i,j}$ in a two-dimensional image, comprising the steps of:

finding conduction coefficients $C_n$, $C_s$, $C_w$, $C_e$, $C_{nw}$, $C_{sw}$, $C_{ne}$ and $C_{se}$ in eight surrounding directions for each pixel based on a pixel value gradient ∇I to produce a two-dimensional distribution image of the conduction coefficients; and finding pixel value first partial differentials $\nabla_n I$, $\nabla_s I$, $\nabla_w I$, $\nabla_e I$, $\nabla_{nw} I$, $\nabla_{sw} I$, $\nabla_{ne} I$ and $\nabla_{se} I$ in the eight surrounding directions for each pixel to calculate a pixel value in an output image according to:

$$I_{i,j}^{n+1} = I_{i,j}^m + \lambda \left[ [C_n \cdot \nabla_n I + C_s \cdot \nabla_s I + C_w \cdot \nabla_w I + C_e \cdot \nabla_e I] + \frac{1}{\sqrt{2}} [C_{nw} \cdot \nabla_{nw} I + C_{sw} \cdot \nabla_{sw} I + C_{ne} \cdot \nabla_{ne} I + C_{nw} \cdot \nabla_{nw} I] \right]_{i,j}^n,$$

(n: the number of times of repetition, λ: a constant).

2. The image processing method of claim 1, wherein said conduction coefficients are found according to:

$$g = e^{-((\|\nabla I\|/k)^2)},$$

(k: a constant).

3. The image processing method of claim 1, wherein said constant λ is $0 \leq \lambda \leq 1/4$.

4. The image processing method of claim 1, wherein said two-dimensional image is a medical image.

5. An image processing apparatus for conducting anisotropic diffusion filtering on a pixel value $I_{i,j}$ in a two-dimensional image, comprising:

a coefficient image producing device for finding conduction coefficients $C_n$, $C_s$, $C_w$, $C_e$, $C_{nw}$, $C_{sw}$, $C_{ne}$ and $C_{se}$ in eight surrounding directions for each pixel based on a pixel value gradient ∇I to produce a two-dimensional distribution image of the conduction coefficients; and a calculating device for finding pixel value first partial differentials $\nabla_n I$, $\nabla_s I$, $\nabla_w I$, $\nabla_e I$, $\nabla_{nw} I$, $\nabla_{sw} I$, $\nabla_{ne} I$ and $\nabla_{se} I$ in the eight surrounding directions for each pixel to calculate a pixel value in an output image according to:

$$I_{i,j}^{n+1} = I_{i,j}^m + \lambda \left[ [C_n \cdot \nabla_n I + C_s \cdot \nabla_s I + C_w \cdot \nabla_w I + C_e \cdot \nabla_e I] + \frac{1}{\sqrt{2}} [C_{nw} \cdot \nabla_{nw} I + C_{sw} \cdot \nabla_{sw} I + C_{ne} \cdot \nabla_{ne} I + C_{nw} \cdot \nabla_{nw} I] \right]_{i,j}^n,$$

(n: the number of times of repetition, λ: a constant).

6. The image processing apparatus of claim 5, wherein said coefficient image producing device finds said conduction coefficients according to:

$$g = e^{-((\|\nabla I\|/k)^2)},$$

(k: a constant).

7. The image processing apparatus of claim 5, wherein said constant λ is $0 \leq \lambda \leq 1/4$.

8. The image processing apparatus of claim 5, wherein said two-dimensional image is a medical image.

* * * * *

UNITED STATES PATENT AND TRADEMARK OFFICE
CERTIFICATE OF CORRECTION

PATENT NO. : 7,277,590 B2  Page 1 of 1
APPLICATION NO. : 10/862082
DATED : October 2, 2007
INVENTOR(S) : Ghosh et al.

It is certified that error appears in the above-identified patent and that said Letters Patent is hereby corrected as shown below:

On the Title Page Item -57- line 2 in the Abstract, at the beginning of the equation, delete " $I_{i,j}^{n+1} = I_{i,j}^{m}$ " and insert therefor -- $I_{i,j}^{n+1} = I_{i,j}^{n}$ --.

In the Specification, column 2, line 1, at the beginning of the equation, delete " $I_{i,j}^{n+1} = I_{i,j}^{m}$ " and insert therefor -- $I_{i,j}^{n+1} = I_{i,j}^{n}$ --.

In the Specification, column 2, line 26, at the beginning of the equation, delete " $I_{i,j}^{n+1} = I_{i,j}^{m}$ " and insert therefor -- $I_{i,j}^{n+1} = I_{i,j}^{n}$ --.

In the Specification, column 4, line 7, at the beginning of the equation, delete " $I_{i,j}^{n+1} = I_{i,j}^{m}$ " and insert therefor -- $I_{i,j}^{n+1} = I_{i,j}^{n}$ --.

In Claim 1, column 5, line 8, at the beginning of the equation, delete " $I_{i,j}^{n+1} = I_{i,j}^{m}$ " and insert therefor -- $I_{i,j}^{n+1} = I_{i,j}^{n}$ --.

In Claim 5, column 6, line 9, at the beginning of the equation, delete " $I_{i,j}^{n+1} = I_{i,j}^{m}$ " and insert therefor -- $I_{i,j}^{n+1} = I_{i,j}^{n}$ --.

Signed and Sealed this

Twenty-fourth Day of June, 2008

JON W. DUDAS
*Director of the United States Patent and Trademark Office*